(12) United States Patent
Hazel et al.

(10) Patent No.: US 7,776,143 B2
(45) Date of Patent: Aug. 17, 2010

(54) PARTICULATE CORROSION RESISTANT COATING COMPOSITION

(75) Inventors: Brian Thomas Hazel, West Chester, OH (US); Michael James Weimer, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/562,611

(22) Filed: Sep. 18, 2009

(65) Prior Publication Data

US 2010/0006001 A1 Jan. 14, 2010

Related U.S. Application Data

(62) Division of application No. 11/311,137, filed on Dec. 20, 2005, now Pat. No. 7,604,867.

(51) Int. Cl.
*C09D 1/00* (2006.01)

(52) U.S. Cl. ............ 106/14.05; 106/14.12; 106/14.14; 106/14.21; 428/469; 428/472

(58) Field of Classification Search ........................ None
See application file for complete search history.

(56) References Cited

U.S. PATENT DOCUMENTS

| | | |
|---|---|---|
| 3,179,524 A | 4/1965 | Donald |
| 4,436,555 A | 3/1984 | Sugama |
| 4,537,632 A | 8/1985 | Mosser |
| 4,564,555 A | 1/1986 | Hornberger |
| 4,606,967 A | 8/1986 | Mosser |
| 4,617,056 A | 10/1986 | Mosser |
| 4,659,613 A | 4/1987 | Mosser |
| 4,724,172 A | 2/1988 | Mosser |
| 4,806,161 A | 2/1989 | Fabiny |
| 4,863,516 A | 9/1989 | Mosser |
| 4,889,558 A | 12/1989 | Mosser |
| 4,917,960 A | 4/1990 | Hornberger |
| 4,975,330 A | 12/1990 | Mosser |
| 5,024,884 A | 6/1991 | Otfinoski |
| 5,066,540 A | 11/1991 | Mosser |
| 5,242,488 A | 9/1993 | Stetson |
| 5,336,560 A | 8/1994 | Spence |
| 5,478,413 A | 12/1995 | Mosser |
| 5,591,380 A | 1/1997 | Wright |
| 6,177,186 B1 | 1/2001 | Skoog |
| 6,210,791 B1 | 4/2001 | Skoog |
| 6,368,394 B1 | 4/2002 | Hughes |
| 6,465,090 B1 | 10/2002 | Stowell |
| 6,544,351 B2 | 4/2003 | Wang |
| 6,827,969 B1 | 12/2004 | Skoog |
| 6,884,460 B2 | 4/2005 | Ackerman |
| 6,884,470 B2 | 4/2005 | Gorman |
| 2007/0104969 A1* | 5/2007 | Nagaraj et al. .............. 428/469 |

OTHER PUBLICATIONS

Sermatech Spotlite, "Solutions to Offshore Corrosion" Technical Paper Presented at NACE 2004, Summer 2004, p. 10.

* cited by examiner

*Primary Examiner*—Ling Xu
(74) *Attorney, Agent, or Firm*—Marcella R. Louke; William Scott Andes; General Electric Co.

(57) ABSTRACT

A composition comprising a glass-forming binder component and a particulate corrosion resistant component. The particulate corrosion resistant component comprises corrosion resistant particulates having: a $CTE_p$ of at least about 4 and being solid at a temperature of about 1300° F. (704° C.) or greater; and a maximum median particle size defined by one of the following formulas: (a) for a $CTE_p$ of 8 or less, an MP equal to or less than $(4.375 \times CTE_p) - 10$; and (b) for a CTEp of greater than 8, an $M_p$ equal to or less than $(-4.375 \times CTE_p) + 60$, wherein $CTE_p$ is the average CTE of the corrosion resistant particulates and wherein $M_p$ is the median equivalent spherical diameter (ESD), in microns, of the corrosion resistant particulates. Also disclosed is an article comprising a turbine component comprising a metal substrate and a corrosion resistant coating overlaying the metal substrate, as well as a method for forming at least one layer of the corrosion resistant coating adjacent to the metal substrate. The corrosion resistant coating has a maximum thickness defined by one of the following formulas: (3) for a $CTE_p$ of 8 or less, an $T_c$ equal to or less than $(1.5 \times CTE_p) - 3.5$; and (4) for a $CTE_p$ of greater than 8, an $T_c$ equal to or less than $(-1.5 \times CTE_p) + 20.5$, wherein $T_c$ is the thickness, in mils, of the corrosion resistant coating.

18 Claims, 3 Drawing Sheets

PARTICULATE CORROSION RESISTANT COATING COMPOSITION

CROSS REFERENCE TO RELATED APPLICATION

This patent application is a divisional application of U.S. patent application Ser. No. 11/311,137, filed Dec. 20, 2005, now U.S. Pat. No. 7,604,867.

BACKGROUND OF THE INVENTION

This invention broadly relates to a corrosion resistant coating composition comprising a particulate corrosion resistant component, and a glass-forming binder component. This invention also broadly relates to an article comprising a turbine component coated with at least one layer of this composition. This invention further broadly relates to a method for coating the article with at least one layer of this composition.

In an aircraft gas turbine engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against the airfoil section of the turbine blades, which turns the shaft and provides power to the compressor. The hot exhaust gases flow from the back of the engine, driving it and the aircraft forward. The hotter the combustion and exhaust gases, the more efficient is the operation of the jet engine. Thus, there is incentive to raise the combustion gas temperature.

The compressors and turbine of the turbine engine can comprise turbine disks (sometimes termed "turbine rotors") or turbine shafts, as well as a number of blades mounted to the turbine disks/shafts and extending radially outwardly therefrom into the gas flow path, and rotating. Also included in the turbine engine are rotating, as well as static, seal elements that channel the airflow used for cooling certain components such as turbine blades and vanes. As the maximum operating temperature of the turbine engine increases, the turbine disks/shafts and seal elements are subjected to higher temperatures. As a result, oxidation and corrosion of the disks/shafts and seal elements have become of greater concern.

Metal salts such as alkaline sulfate, sulfites, chlorides, carbonates, oxides, and other corrodant salt deposits resulting from ingested dirt, fly ash, volcanic ash, concrete dust, sand, sea salt, etc. are a major source of the corrosion, but other elements in the bleed gas environment can also accelerate the corrosion. Alkaline sulfate corrosion in the temperature range and atmospheric region of interest results in pitting of the turbine disk/shaft and seal element substrate at temperatures typically starting around 1000° F. (538° C.). This pitting corrosion has been shown to occur on critical turbine disk/shaft and seal elements. The oxidation and corrosion damage can lead to premature removal and replacement of the disks and seal elements unless the damage is reduced or repaired.

Turbine disks/shafts and seal elements for use at the highest operating temperatures are typically made of nickel-base superalloys selected for good elevated temperature mechanical properties such as fatigue resistance. These superalloys have resistance to oxidation and corrosion damage, but that resistance may not be sufficient to protect them at sustained operating temperatures now being reached in gas turbine engines. Disks and other rotor components made from newer generation alloys may also contain lower levels of chromium, and may therefore be more susceptible to corrosion attack.

Corrosion resistant coating compositions have been suggested for use with various gas turbine components. These include aqueous corrosion resistant coating compositions comprising phosphate/chromate binder systems and aluminum/alumina particles. See, for example, U.S. Pat. No. 4,537,632 (Mosser), issued Aug. 27, 1985 and U.S. Pat. No. 4,606,967 (Mosser), issued Aug. 19, 1986 (spheroidal aluminum particles); and U.S. Pat. No. 4,544,408 (Mosser et al), issued Oct. 1, 1985 (dispersible hydrated alumina particles). Corrosion resistant diffusion coatings can also be formed from aluminum or chromium, or from the respective oxides (i.e., alumina or chromia). See, for example, commonly assigned U.S. Pat. No. 5,368,888 (Rigney), issued Nov. 29, 1994 (aluminide diffusion coating); and commonly assigned U.S. Pat. No. 6,283,715 (Nagaraj et al), issued Sep. 4, 2001 (chromium diffusion coating). A number of corrosion-resistant coatings have also been specifically considered for use on turbine disk/shaft and seal elements. See, for example, commonly assigned U.S. Patent Application 2004/0013802 A1 (Ackerman et al), published Jan. 22, 2004 (metal-organic chemical vapor deposition of aluminum, silicon, tantalum, titanium or chromium oxide on turbine disks and seal elements to provide a protective coating).

Another corrosion resistant coating that has been used comprises an alumina pigment in a chromate-phosphate binder having hexavalent chromium (commercially marketed by Sermatech International as SermaFlow® N3000). While such a hexavalent chromium-containing coating is effective at low temperatures, it has a lower coefficient of thermal expansion relative to the underlying metal substrate (e.g. superalloy) so that at the higher temperatures experienced by newer gas turbine engines, this hexavalent chromium-containing coating may spall, even when applied at thicknesses of as thin as 0.5 to 2.5 mils (12.7 to 63.5 microns). In fact, at thicknesses of greater than 1.5 mils (38.1 microns), this coating may delaminate after one thermal cycle at 1300° F. (704° C.). While this delamination problem is most evident on the newer high performance gas turbine engines, this problem may also occur with other gas turbine engines because of the temperature extremes dictated by engine operation.

While these prior corrosion resistant coatings may provide corrosion protection for turbine disk/shaft and seal elements, there remains a need for improved corrosion resistant coatings that address the disadvantages of these prior corrosion resistant coatings, including: (1) possible adverse affects on the fatigue life of the turbine disks/shafts and seal elements, especially when these prior coatings diffuse into the underlying metal substrate; (2) potential coefficient of thermal expansion (CTE) mismatches between the coating and the underlying metal substrate that may make the coating more prone to spalling; and (3) requiring more complicated and expensive processes (e.g., chemical vapor deposition) for applying the corrosion resistant coating to the metal substrate.

BRIEF DESCRIPTION OF THE INVENTION

An embodiment of this invention broadly relates to a composition comprising:
a glass-forming binder component; and
a particulate corrosion resistant component comprising corrosion resistant particulates having:
a $CTE_p$ of at least about 4 and being solid at a temperature of about 1300° F. (704° C.) or greater; and
a maximum median particle size defined by one of the following formulas:
(1) for a $CTE_p$ of 8 or less, an $M_p$ equal to or less than $(4.375 \times CTE_p) - 10$; and (2) for a $CTE_p$ of greater than 8, an $M_p$ equal to or less than $(-4.375 \times CTE_p) + 60$.

wherein $CTE_p$ is the average CTE of the corrosion resistant particulates and wherein $M_p$ is the median equivalent spherical diameter (ESD), in microns, of the corrosion resistant particulates.

DETAILED DESCRIPTION OF THE INVENTION

Figure 1:
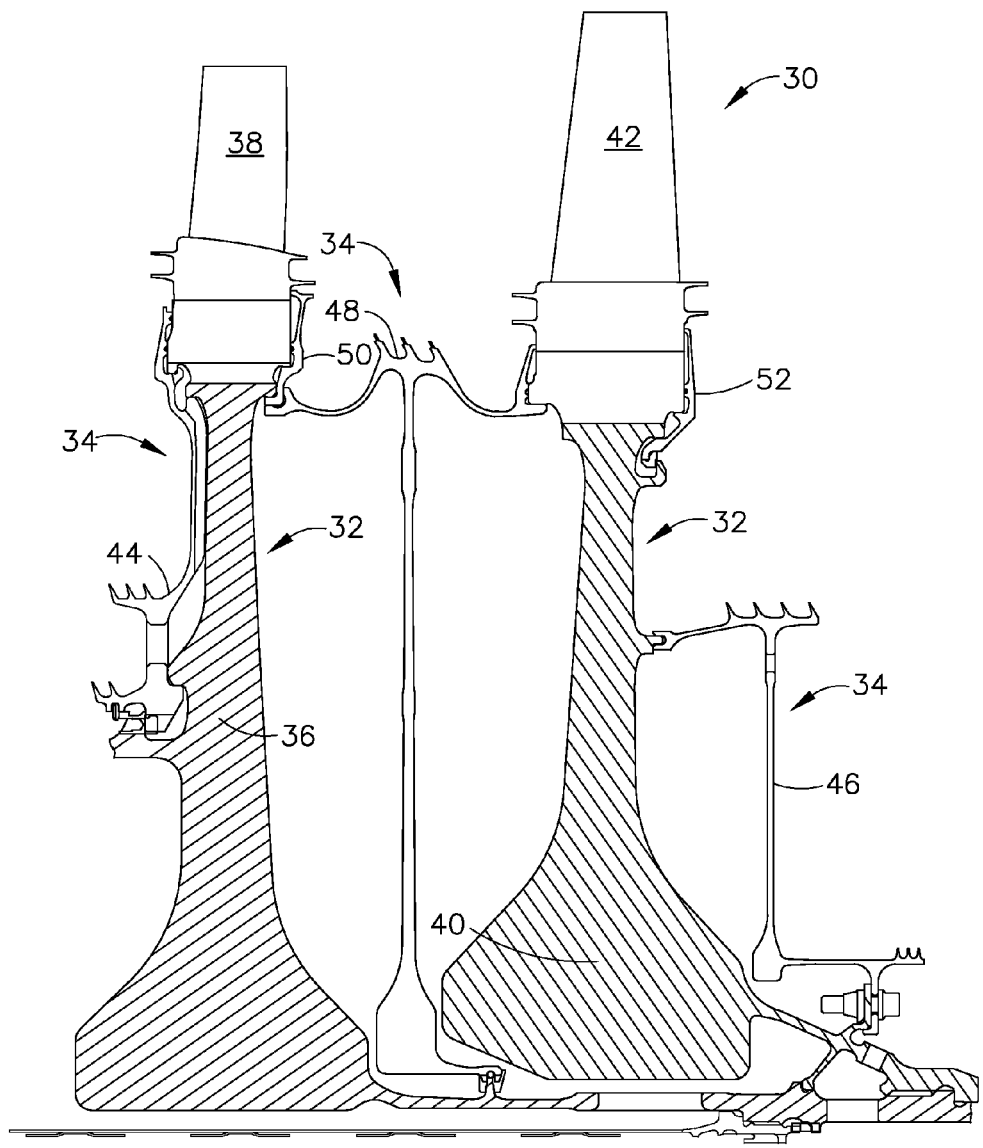
FIG. 1 is a schematic sectional view of a portion of the turbine section of a gas turbine engine.

As used herein, the term "particulate" refers to a particle, powder, flake, etc., that inherently exists in a relatively small form (e.g., a maximum particle size of about 62.5 microns or less, and typically a median ESD of about 25 microns or less) and may be formed by, for example, grinding, shredding, fragmenting, pulverizing, atomizing, or otherwise subdividing a larger form of the material into a relatively small form. Particulates useful in the corrosion resistant particulate components herein may have a maximum particle size in the range of from about 18.5 or less, to about 62.5 microns or less, and a maximum median particle size (as determined by the median ESD) in the range of from about 7.5 microns or less, to about 25 microns or less, more typically in the range of from about 3.8 microns or less, to about 12.5 microns or less. The maximum particle size of the particulates useful herein is primarily dependent on the $CTE_p$ thereof and is abbreviated herein as "$A_p$" and is defined herein in terms of microns.

As used herein, the term "equivalent spherical diameter" (ESD) refers to a diameter of a sphere having the same volume as that of an irregular particle. See commonly assigned U.S. Pat. No. 6,544,351 (Wang et al.), issued Apr. 8, 2003, the relevant disclosures of which are incorporated by reference. Particles useful herein may have a spherical shape, nearly spherical shape, irregular shape, etc., or any combination of shapes.

As used herein, the term "median ESD" refers to the ESD for which 50% (by volume) of the population of particles have an ESD below that value. See commonly assigned U.S. Pat. No. 6,544,351 (Wang et al.), issued Apr. 8, 2003, the relevant disclosures of which are incorporated by reference. The maximum median ESD of the corrosion resistant particulates useful herein is primarily dependent on the $CTE_p$ thereof and is abbreviated herein as "$M_p$" and is defined herein in terms of microns.

As used herein, the term "unimodal particle size distribution" refers to a particle size distribution comprising one particle size fraction. When graphically plotted (i.e., by particle count as a function of particle size), a unimodal particle size distribution has essentially a single peak.

As used herein, the term "bimodal particle size distribution" refers to a particle size distribution that comprises a larger particle size fraction and a smaller particle size fraction. When graphically plotted (i.e., by particle count as a function of particle size), a bimodal particle size distribution has essentially two distinct peaks. Bimodal particle size distributions provide a greater solids packing density for the corrosion resistant particulate component. For bimodal particle size distributions useful herein, the larger particle size fraction may comprise particulates having a median ESD at least about 5 times (typically in the range of from about 7 to about 10 times) that of the median ESD of the particulates comprising the smaller particulate size fraction. For bimodal particle size distributions useful herein, the larger particle size fraction typically comprises from about 60 to about 95% by volume of the corrosion resistant particulate component, while the smaller particle size fraction typically comprises from about 5 to about 40% by volume of the corrosion resistant particulate component.

As used herein, the term "polymodal particle size distribution" refers to a particle size distribution that comprises three or more particle size fractions. When graphically plotted (i.e., by particle count as a function of particle size), a polymodal particle size distribution has three or more distinct peaks.

As used herein, the term "solid at a temperature of about 1300° F. (704° C.) or greater" refers to a particulate comprising a ceramic, metal, etc., and combinations thereof that are solid (i.e., do not melt or are not molten) at a temperature of about 1300° F. (704° C.) or greater (e.g., above the melting point of aluminum), and typically are solid at a temperature of about 1400° F. (760° C.) or greater. The particular temperature at which the particulates should be solid will depend, at least in part, on the maximum operating temperature of the environment that the coated component is exposed to, and is desirably in excess of the maximum operating temperature of the environment that the coated component is exposed to.

As used herein, the term "substantially free" means the indicated compound, material, component, etc., is minimally present (e.g., trace amount) or not present at all, e.g., at a level of about 0.5% or less, more typically at a level of about 0.1% or less, unless otherwise specified.

As used herein, the term "metal" can refer to a single metal (other than solely aluminum) or a metal alloy, i.e., a blend of at least two metals (for example, may include nickel-aluminum alloys, etc.). Metals may include chromium, zirconium, nickel, cobalt, iron, titanium, yttrium, magnesium, platinum group metals (e.g., platinum, palladium, rhodium, iridium, etc.), hafnium, silicon, tantalum, lanthanum, etc., alloys of any of these metals, and alloys of any of these metals with aluminum, e.g., overlay metal alloys. Illustrative corrosion resistant alloys useful herein may include, but are not limited to overlay metal alloys, other corrosion resistant superalloys with chromium or aluminum levels above that of R88DT (16.0 wt % Cr, 2.1 wt % Al), such as IN601 (23.0 wt % Cr), IN625 (21.5 wt % Cr), IN718 (19 wt % Cr), GTD222 (22.5 wt % Cr), Hastelloy X (22.0 wt % Cr), Udimet 500 (19.0 wt % Cr, 3.0 wt % Al), René N2 (6.6 wt % Al), René 77 (4.3 wt % Al), MarM 509 (23.5 wt % Cr), HS 188 (22.0 wt % Cr), etc.

As used herein, the term "ceramic" refers to an oxide, carbide, nitride, etc., of a metal. Ceramics suitable for use herein may include oxides carbides, nitrides, etc., of any of the metals referred to herein, combinations of such oxides, carbide, nitride, etc., including, but not limited to zirconia and phase-stabilized zirconias (i.e., various metal oxides, for example, yttrium oxides blended with zirconia), such as yttria-stabilized zirconias, ceria-stabilized zirconias, calcia-stabilized zirconias, scandia-stabilized zirconias, magnesia-stabilized zirconias, ytterbia-stabilized zirconias, etc., as well as mixtures of such stabilized zirconias. See, for example, Kirk-Othmer's Encyclopedia of Chemical Technology, 3rd Ed., Vol. 24, pp. 882-883 (1984) for a description of suitable zirconias. Suitable yttria-stabilized zirconias can comprise from about 1 to about 65% yttria (based on the combined weight of yttria and zirconia), and more typically from about 3 to about 10% yttria. Other suitable ceramics for use herein may include alumina, chromia, silica, titania, ceria, magnesia, hafnia (including phase stabilized hafnias such as yttria-stabilized hafnia), yttrium aluminum garnet (YAG), lanthanum hexaluminate, and other metal aluminates, chromium carbide ($Cr_2C_3$), etc., or combinations thereof Suitable ceramics for use herein will have: (1) a corrosion resistance greater than that of an R88DT alloy; and (2) a CTE that is at least equal to, and more typically greater than, the CTE of alumina.

As used herein, the term "overlay metal alloy" refers to metal alloys having the formula MCr, MAl, MCrAl, MCrAlX, or MAlX, wherein M is nickel, cobalt, iron, etc., or an alloy thereof, and wherein X is hafnium, zirconium, yttrium, tantalum, platinum, palladium, rhenium, silicon, lanthanum, etc., or a combination thereof. Typically, the overlay metal alloys used herein are MCrAlY alloys, and more typically wherein M is nickel, cobalt, or a nickel-cobalt alloy and wherein X is yttrium (i.e., Y). Illustrative MCrAlY alloys useful herein may include, but are not limited to those comprising 22.0 wt % Cr, 10.0 wt % Al, 1.00 Y, the balance being nickel (i.e., M is nickel), or 32.0 wt % Ni, 21.0 wt % Cr, 8.0 wt % Al, 0.50 Y, the balance being cobalt (i.e., M is nickel-cobalt alloy).

As used herein, the term "corrosion resistant particulate" refers to particulates comprising metals, ceramics or combinations thereof that provide greater resistance than that of the metals comprising the substrate against corrosion caused by various corrodants, including metal (e.g., alkaline) sulfates, sulfites, chlorides, carbonates, oxides, and other corrodant salt deposits resulting from ingested dirt, fly ash, volcanic ash, concrete dust, sand, sea salt, etc., at temperatures greater than of about 1000° F. (538° C.), and typically about 1300° F. (704° C.) or greater (e.g., above the melting point of aluminum).

As used herein, the term "corrosion resistant coating" refers to coatings that, after curing of the deposited corrosion resistant coating composition, comprise at least one layer having an amorphous, glassy matrix and having embedded therein, encapsulated therein, enclosed thereby, or otherwise adhered thereto, particulates from the corrosion resistant particulate component. Embodiments of the corrosion resistant coatings of this invention can provide resistance against corrosion caused by various corrodants, including metal (e.g., alkaline) sulfates, sulfites, chlorides, carbonates, oxides, and other corrodant salt deposits resulting from ingested dirt, fly ash, volcanic ash, concrete dust, sand, sea salt, etc., at temperatures of about 1000° F. (538° C.) or greater, typically about 1300° F. (704° C.) or greater (e.g., above the melting point of aluminum), and comprise ceramics, metals, etc., and combinations thereof. The embodiments of the corrosion resistant coatings of this invention may be homogeneous or substantially homogeneous throughout in the terms of the composition of the particulate and binder components, or may comprise a discrete layer(s) that comprises a homogenous or substantially homogeneous composition of the particulate and binder components. For example, some embodiments of the corrosion resistant coatings of this invention may be a single layer comprising particulates throughout that have a particular CTE value, or may be a plurality of layers of differing composition, e.g., an inner layer adjacent to the metal substrate that comprises particulates having a higher CTE value to more closely match the CTE of the metal substrate, an intermediate layer (or layers) that comprises particulates having a lower CTE value that is compatible with the CTE of the inner layer, and an outer layer that consists essentially of a composition that is similar to a glass-forming binder component but without particulates, e.g., a sealant composition that forms a glassy top coat. The maximum thickness of the corrosion resistant coatings useful herein are primarily dependent on the $CTE_p$ of the corrosion resistant particulates. The thickness of the corrosion resistant coating is abbreviated herein as "$T_c$" and is defined herein in terms of mils.

A used herein, the term "glass-forming binder component" refers to a component comprising a typically inorganic compound, composition, etc., that, when cured, forms an amorphous, glassy matrix to which the particulates in the particulate component are embedded in, are encapsulated in, are enclosed by, or otherwise adhered to. Binder components suitable for use herein typically comprise a phosphate binder, with or without other binder materials. These phosphate binders may be in the form of phosphoric acid or more typically the respective phosphate compounds/compositions, including orthophosphates, pyrophosphates, etc. These phosphate compounds/compositions may be monobasic, dibasic, tribasic or any combination thereof. Phosphate-containing binder components may comprise one or more metal phosphates, including aluminum phosphates, magnesium phosphates, chromium phosphates, zinc phosphates, iron phosphates, lithium phosphates, calcium phosphates, etc, or any combination thereof. Typically, the phosphate-containing binder component comprises an aluminum phosphate, a magnesium phosphate, a chromium phosphate, or a combination thereof. The phosphate-containing binder component may optionally comprise other binder materials, including one or more chromates, molybdates, etc. See, for example, U.S. Pat. No. 3,248,249 (Collins, Jr.), issued Apr. 26, 1966; U.S. Pat. No. 3,248,251 (Allen), issued Apr. 26, 1966; U.S. Pat. No. 4,889,858 (Mosser), issued Dec. 26, 1989; U.S. Pat. No. 4,975,330 (Mosser), issued Dec. 4, 1990, the relevant portions of which are incorporated by reference. The phosphate-containing binder component can also be substantially free of other binder materials, e.g., a substantially chromate free phosphate-containing binder component. See, for example, U.S. Pat. No. 6,368,394 (Hughes et al), issued Apr. 9, 2002 (substantially chromate free phosphate binder component), the relevant portion of which is incorporated by reference.

As used herein, the term "liquid carrier component" refers to any carrier component that is liquid at ambient temperatures and in which the corrosion resistant particulate component and glass-forming binder component is typically carried in, dispersed in, dissolved in, etc. Liquid carrier components include aqueous systems (e.g., comprising water), organic systems (e.g., comprising alcohols such as ethanol, propanol, isopropanol, etc., other liquid organic materials or solvents such as ethylene glycol, acetone, etc.) or any combination thereof. These liquid carrier components may comprise other optional materials such as surfactants, buffers, etc. Aqueous carrier components may consist essentially of water, i.e., is substantially free of other optional materials, but more typically comprises other optional materials such as compatible organic solvents, surfactants, etc. Suitable surfactants for use in aqueous carrier components may include nonionic surfactants, anionic surfactants, cationic surfactants, amphoteric surfactants, zwitterionic surfactants, or any combination thereof. Illustrative examples of surfactants suitable for use herein include ethoxylated alkyl phenols or aliphatic alcohols such as those sold under various trade names or trademarks including Igepal, Levelene, Neutronyx, Surfonic and Triton, nonionic tertiary glycols such as Surfynol 104, cationic secondary and tertiary amines of the polyoxy cocamine type exemplified by Armak Ethomeen C/20 and Emery 6601, quaternary amines such as Armak Ethoquad R/13-50, as well as sodium heptadecyl sulfate, sodium tetradecyl sulfate and sodium 2-ethylhexyl sulfate. The inclusion of surfactants may be for the purpose of improving the wettability of the particulate component, reducing the surface tension of the corrosion resistant coating composition, promoting the formation of improved smoothness in the resultant corrosion resistant coating, etc.

As used herein, the term "corrosion resistant coating composition" refers to any embodiment of the coating composition of this invention comprising the corrosion resistant particulate component, the glass-forming binder component, optionally a liquid carrier component, etc., and which is used to form at least one layer of the corrosion resistant coating of this invention. For embodiments of corrosion resistant coating compositions of this invention, the ratio of the corrosion resistant particulate component to glass-forming binder component is typically in the range from about 0.1 to about 10, more typically in the range of from about 0.5 to about 5. The optional liquid carrier component, when included, typically comprises the balance of the corrosion resistant coating composition of this invention. The embodiments of the corrosion resistant coating compositions of this invention may be formulated as flowable solids (e.g., flowable powders), may be formulated as cast tapes comprising a blend, mixture or other combination of the particulate and binder components, with or without a supporting structure such as a film, strip, etc., or may be formulated as liquids. The embodiments of the corrosion resistant coating compositions of this invention may comprise other optional components such as colorants or pigments, viscosity modifying or controlling agents, etc. Typically, the embodiments of the corrosion resistant coating compositions of this invention are formulated as liquid compositions. The embodiments of the liquid corrosion resistant coating compositions of this invention may be of any desired consistency, flowability, viscosity, etc., including thixotropic or non-thixotropic compositions. The embodiments of the aqueous corrosion resistant coating compositions of this invention often have an acidic pH (i.e., below about 7). For example, for embodiments of the aqueous corrosion resistant coating compositions comprising a phosphate-containing binder component, the pH is typically in the range of from about 0 to about 3, and more typically in the range of from about 1 to about 3.

As used herein, the term "curing" refers to any treatment condition or combination of treatment conditions that causes the corrosion resistant coating composition to thereby form the corrosion resistant coating. Typically, curing occurs by heating the corrosion resistant coating composition at a temperature of at least about 250° F. (121° C.), more typically at a temperature of at least about 500° F. (260° C.).

As used herein, the term "turbine component" refers to any turbine component that comprises a metal substrate (i.e., the substrate is formed from metals or metal alloys), and includes turbine components comprising airfoils (e.g., blades, vanes, etc.), turbine disks (also referred to sometimes as "turbine rotors"), turbine shafts, turbine seal elements that are either rotating or static, including forward, interstage and aft turbine seals, turbine blade retainers, other static turbine components, etc. The turbine component for which the embodiments of the corrosion resistant coatings of this invention are particularly advantageous are those that experience a service operating temperature of at least about 1000° F. (538° C.), more typically at least about 1200° F. (649° C.), and typically in the range of from about 1200° to about 1600° F. (from about 649° to about 871° C.). These components are usually exposed to compressor bleed air or gas path environments having ingested corrosive components, typically metal sulfates, sulfites, chlorides, carbonates, etc., that can deposit on the surface of the component. The embodiments of the corrosion resistant coatings of this invention are particularly useful when formed on all or selected portions of the surfaces of the component, such as the surfaces of turbine disks/shafts and turbine seal elements. For example, the rim and blade slots of the hub of a turbine disk (e.g., perimeter) may have the corrosion resistant coating of this invention, while the bore region and inner portion of the turbine disk may or may not have this coating. In addition, the contact points or mating surfaces between these components such as the disk post pressure faces, as well as the contact points between the disks, shafts and/or seals, may be void or absent of the corrosion resistant coating so as to retain desired or specified as produced dimensions, but do not necessarily need to be void or absent of the coating.

As used herein, the term "CTE" refers to the coefficient of thermal expansion of a material with reference to a temperature of about 1200° F. (649° C.) unless otherwise specified, and is referred to herein in units of $10^{-6}/°$ F. For example, alumina which has a coefficient of thermal expansion of about 4 to $5 \times 10^{-6}/°$ F. at about 1200° F. (649° C.) is referred to herein as having a CTE of about 4 to 5. The average CTE of the corrosion resistant particulates comprising the corrosion resistant particulate component is referred to herein by the abbreviation "$CTE_p$." Materials useful for corrosion resistant particulates herein have $CTE_p$ values of at least about 4, and typically in the range of from about 4 to about 12.

As used herein, the term "comprising" means various particulates, materials, coatings, compositions, components, layers, steps, etc., can be conjointly employed in the present invention. Accordingly, the term "comprising" encompasses the more restrictive terms "consisting essentially of" and "consisting of."

All amounts, parts, ratios and percentages used herein are by weight unless otherwise specified.

Corrosion resistant coating compositions comprising corrosion resistant ceramics and/or metal particulates and phosphate-containing binder systems, with or without additional chromate binders or other binder materials, may be used to provide corrosion resistant coatings for turbine seals and other turbine components such as turbine disks and shafts. The ability to easily and inexpensively form such corrosion resistant coatings over metal substrates of turbine components such as turbine seals, turbine disks, turbine shafts and turbine blades makes them desirable. For example, these compositions can be delivered by relatively easy and inexpensive techniques, for example, by spraying an aqueous coating composition comprising the corrosion resistant particulates and phosphate-containing binder system (with or without other binder materials) over or on the metal substrate of the component, followed by heating to a curing temperature of, for example, at least about 250° F. (121° C.), more typically at least about 500° F. (260° C.) to provide a corrosion resistant coating comprising corrosion resistant particulates adhered to or within a glassy phosphate-containing binder matrix.

For turbine seals and other turbine components such as turbine disks and shafts requiring such corrosion resistant coatings, it has been discovered that the size of the corrosion resistant particulates used, as well as the coating thickness, should be controlled based on the $CTE_p$ of the corrosion resistant particulate to avoid or minimize problems, such as spallation, while at the same time providing effective corrosion resistance for the underlying metal substrate. Many metal substrates comprise metals or metal alloys (e.g., superalloys) that have CTEs equal or close to about 8 (e.g., in the range of from about 7 to about 9). As the $CTE_p$ of the corrosion resistant particulates varies from about 8, e.g., decreases to about 4 (i.e., lower CTE particulates) or increases to, for example, about 12 (i.e., higher CTE particulates), the potential for CTE mismatches with the underlying metal substrate increase, thus increasing the potential for spallation of the coating. For example, when using alumina particulates having a CTE of about 4 or 5, a relatively thin coating thickness of about 2.5 mils (63.5 microns) or less, more typically to about 1.5 mils (38.1 microns) or less, may be necessary to avoid spallation due to the CTE mismatch with the metal substrate.

To provide greater control in obtaining coatings having such relatively thin thicknesses (e.g., about 8.5 mils (215.9 microns) or less for coatings comprising particulates with CTEs at or about 8, to about 2.5 mils (63.5 microns) or less for coatings comprising particulates with CTEs at or about 4 or 12), it may also be desirable to deposit the coating composition as a plurality of very thin layers. Unfortunately, the particulates in corrosion resistant coating compositions may vary greatly in particle size and in particle size distribution. For example, corrosion resistant coating compositions comprising alumina particulates may have particles ranging in size from about 0.1 to about 10 microns or larger. To achieve effective coating protection with compositions having alumina particulates of about 10 microns or larger (i.e., at least 1 particulate between the coating surface exposed to the corrodants and the metal substrate surface), the coating may need to be applied at a thickness of about 0.5 mils (12.5 microns) or greater. Having to apply layers of the coating at thicknesses of about 0.5 mils (12.5 microns) or greater makes it much more difficult to achieve the degree of thickness control required to achieve the desired corrosion resistant protection for the underlying metal substrate.

Other types of corrosion resistant coatings, such as thin diffusion coatings of alumina or chromia, may be deposited with thicknesses as thin as ~3 microns. However, these alternative coatings such as diffusion coatings need to be applied by more complicated processes or techniques such as physical vapor deposition (PVD), chemical vapor deposition (CVD), pack cementation, etc. These more complicated processes or techniques may cost significantly more to carry out than those used to apply aqueous corrosion resistant coating compositions.

The embodiments of the compositions, coatings and methods of this invention solve these problems by achieving greater control of coating thicknesses, e.g., thinner coating thicknesses of about 2.5 mils (63.5 microns) or less for corrosion resistant particulates having CTEs approaching about 4 or about 12, to about 8.5 mils (215.9 microns) or less for corrosion resistant particulates having CTEs approaching that of the metal substrate, e.g., about 8. This greater coating thickness control is achieved through the use of corrosion resistant coating particulates having a maximum median ESD ($M_p$), in microns, that is related to the $CTE_p$ of the particulates. For corrosion resistant components useful herein, the maximum median particle size of the corrosion resistant particulates are defined by one of the following formulas: (1) for a $CTE_p$ of 8 or less, an $M_p$ equal to or less than $(4.375 \times CTE_p) - 10$; and (2) for a $CTE_p$ of greater than 8, an $M_p$ equal to or less than $(-4.375 \times CTE_p) + 60$, wherein $CTE_p$ is the average CTE of the particulates and $M_p$ is the median ESD of the particulates. Formulas (1) and (2) typically provide particle size distributions of the corrosion resistant particulates such that the deposited particulates comprise about 20% or less of the maximum coating thickness. More typically, the maximum median particle size of the corrosion resistant particulates useful herein are defined by one of the following formulas: (3) for a $CTE_p$ of 8 or less, an $M_p$ equal to or less than $(2.1875 \times CTE_p) - 5$; and (4) for a $CTE_p$ of greater than 8, an $M_p$ equal to or less than $(-2.1875 \times CTE_p) + 30$. Formulas (3) and (4) typically provide particle size distributions of the corrosion resistant particulates such that the deposited particulates comprise about 10% or less of the maximum coating thickness.

In certain embodiments, it may also be desirable to use corrosion resistant particulates having a maximum particle size. The maximum particle size ($A_p$), in microns, of the corrosion resistant particulates typically useful herein is defined by one of the following formulas: (5) for a $CTE_p$ of 8 or less, an $A_p$ equal to or less than $(10.938 \times CTE_p) - 25$; and (6) for a $CTE_p$ of greater than 8, an $A_p$ equal to or less than $(-10.938 \times CTE_p) + 150$. Formulas (5) and (6) typically provide maximum particle sizes of the corrosion resistant particulates such that the larger deposited particulates comprise about 50% or less of the maximum coating thickness.

In addition to the particle size of the corrosion resistant particulates, the maximum thicknesses of the corrosion resistant coating are also controlled by correlating the coating thickness ($T_c$), in mils, with the $CTE_p$ of the corrosion resistant particulates used. For corrosion resistant coatings useful herein, the maximum coating thickness is defined by one of the following formulas: (7) for a $CTE_p$ of 8 or less, a $T_c$ equal to or less than $(1.5 \times CTE_p) - 3.5$; and (8) for a $CTE_p$ of greater than 8, a $T_c$ equal to or less than $(-1.5 \times CTE_p) + 20.5$. More typically, the maximum thickness is defined by one of the following formulas: (9) for a $CTE_p$ of 8 or less, a $T_c$ equal to or less than $(0.875 \times CTE_p) - 2$; and (10) for a $CTE_p$ of greater than 8, a $T_c$ equal to or less than $(-0.875 \times CTE_p) + 12$.

By controlling, and in the case of corrosion resistant particulates having CTEs that vary from that of the metal substrate, reducing the $M_p$ (and typically the $A_p$) of the corrosion resistant particulates in the composition or coating, the maximum thickness of the resultant coating may be decreased, e.g., to about 2.5 mils (63.5 microns) or less, more typically to about 1.5 mils (38.1 microns) or less, and still achieve effective corrosion resistant protection. These lower median (as well as maximum) particle sizes also enable a plurality of thinner layers of the composition to be applied with potentially greater thickness control. This greater thickness control provides the ability to achieve effective corrosion protection for the metal substrate that may be less susceptible to cyclic spallation, especially if there are significant differences in CTE between the coating particulates and the underlying metal substrate.

Embodiments of the compositions may also use corrosion resistant particulate components having a bimodal particle size distributions comprising a larger particle size fraction having a median ESD at least about 5 times (typically in the range of from about 7 to about 10 times) that of the median ESD of the particulates comprising the smaller particulate size fraction. The use of corrosion resistant particulate components having a bimodal particle size distribution may increase the packing efficiency of the corrosion resistant particulate component, and further facilitate achieving corrosion resistance with thinner coatings comprising such corrosion resistant particulate components. Embodiments of the compositions of this invention may also employ compositions comprising corrosion resistant particulates of various ceramics and/metals of differing CTE values for depositing a plurality of coating layers, further increasing the ability to make such coatings more CTE-compatible with the underlying metal substrate.

The various embodiments of turbine components having the corrosion resistant coating of this invention are further illustrated by reference to the drawings as described hereafter. Referring to FIG. 1, a turbine engine rotor component 30 is provided that can be of any operable type, for example, a turbine disk 32 or a turbine seal element 34. FIG. 1 schematically illustrates a stage 1 turbine disk 36, a stage 1 turbine blade 38 mounted to the turbine disk 36, a stage 2 turbine disk 40, a stage 2 turbine blade 42 mounted to the turbine disk 40, a forward turbine seal 44 that also functions as a forward blade retainer for blade 38, an aft turbine seal 46, and an interstage turbine seal 48 that also functions as a forward blade retainer for blade 42, an aft blade retainer 50 for blade 38 that is held in place by seal 48, and an aft blade retainer 52 for blade 42. Any or all of these turbine disks 32 (e.g., stage 1 turbine disk 36 and a stage 2 turbine disk 40), turbine seal elements 34 (e.g., forward turbine seal 44, aft turbine seal 46, and interstage turbine seal 48) and/or blade retainers 50/52, or any selected portion thereof, can be provided with the ceramic corrosion resistant coating of this invention, depending upon whether corrosion is expected or observed.

Figure 2:
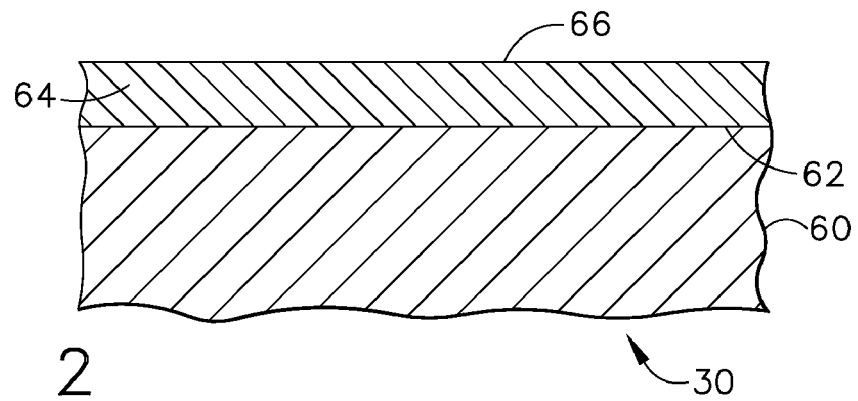
FIG. 2 is a sectional view of a corrosion resistant coating of this invention deposited on the metal substrate of a turbine component.

Referring to FIG. 2, the metal substrate 60 of the turbine engine rotor component 30 may comprise any of a variety of metals, or more typically metal alloys, including those based on nickel, cobalt and/or iron alloys. Substrate 60 typically comprises a superalloy based on nickel, cobalt and/or iron. Such superalloys are disclosed in various references, such as, for example, commonly assigned U.S. Pat. No. 4,957,567 (Krueger et al), issued Sep. 18, 1990, and U.S. Pat. No. 6,521,175 (Mourer et al), issued Feb. 18, 2003, the relevant portions of which are incorporated by reference. Superalloys are also generally described in Kirk-Othmer's Encyclopedia of Chemical Technology, 3rd Ed., Vol. 12, pp. 417-479 (1980), and Vol. 15, pp. 787-800 (1981). Illustrative nickel-based superalloys are designated by the trade names Inconel®, Nimonic®, René® (e.g., René® 88 and René® 104 alloys), and Udimet®.

Substrate 60 more typically comprises a nickel-based alloy, and particularly a nickel-based superalloy, that has more nickel than any other element. The nickel-based superalloy may be strengthened by the precipitation of gamma prime or a related phase. A nickel-based superalloy for which the ceramic corrosion resistant coating of this invention is particularly useful is available by the trade name René 88, which has a nominal composition, by weight of 13% cobalt, 16% chromium, 4% molybdenum, 3.7% titanium, 2.1% aluminum, 4% tungsten, 0.70% niobium, 0.015% boron, 0.03% zirconium, and 0.03 percent carbon, with the balance nickel and minor impurities.

Prior to forming the corrosion resistant coating 64 of this invention on the surface 62 of metal substrate 60, surface 62 is often pretreated mechanically, chemically or both to make the surface more receptive for coating 64. Suitable pretreatment methods include grit blasting, with or without masking of surfaces that are not to be subjected to grit blasting (see commonly-assigned U.S. Pat. No. 5,723,078 to Nagaraj et al, issued Mar. 3, 1998, especially col. 4, lines 46-66, which is incorporated by reference), micromachining, laser etching (see U.S. Pat. No. 5,723,078 to Nagaraj et al, issued Mar. 3, 1998, especially col. 4, line 67 to col. 5, line 3 and 14-17, which is incorporated by reference), treatment with chemical etchants such as those containing hydrochloric acid, hydrofluoric acid, nitric acid, ammonium bifluorides and mixtures thereof, (see, for example, U.S. Pat. No. 5,723,078 to Nagaraj et al, issued Mar. 3, 1998, especially col. 5, lines 3-10; U.S. Pat. No. 4,563,239 to Adinolfi et al, issued Jan. 7, 1986, especially col. 2, line 67 to col. 3, line 7; U.S. Pat. No. 4,353,780 to Fishter et al, issued Oct. 12, 1982, especially col. 1, lines 50-58; and U.S. Pat. No. 4,411,730 to Fishter et al, issued Oct. 25, 1983, especially col. 2, lines 40-51, the relevant portions of which are incorporated by reference), treatment with water under pressure (i.e., water jet treatment), with or without loading with abrasive particles, as well as various combinations of these methods. Typically, the surface 62 of metal substrate 60 is pretreated by grit blasting where surface 62 is subjected to the abrasive action of silicon carbide particles, steel particles, alumina particles or other types of abrasive particles. These particles used in grit blasting are typically alumina particles and typically have a particle size of from about 600 to about 35 mesh (from about 25 to about 500 micrometers), more typically from about 360 to about 35 mesh (from about 35 to about 500 micrometers).

The corrosion resistant coating 64 may be formed on metal substrate 60 by any method comprising the steps of: (a) depositing at least one layer of the corrosion resistant coating composition on metal substrate 60; and (b) curing the deposited coating composition at a temperature that causes the corrosion resistant particulate component and glass-forming binder component to form at least one layer of the corrosion resistant coating 64 that is adjacent to metal substrate 60 and comprises an amorphous, glassy matrix of binder to which the particulates in the particulate component are embedded in, encapsulated in, enclosed by, or otherwise adhered to. The corrosion resistant coating composition may be deposited in solid form, e.g., as a flowable solid, as a cast tape (e.g., a cast tape formed as a layer or plurality layers of particulates adhered together as a coherent mass or matrix by the binder, with or without a supporting structure such as a film, strip, etc.), etc, to provide a solid uncured layer of the composition comprising the particulates and binder component.

More typically, the coating composition is deposited as a liquid, e.g., an aqueous coating composition. Liquid corrosion resistant coating compositions of this invention may be deposited over or on substrate 60 by any manner of application for depositing liquids including pouring, flowing, dipping, spraying, rolling, etc., to provide an uncured layer of the composition comprising the particulates and binder component. This deposited solid or liquid uncured composition layer is then cured, typically by heating to a temperature of at least about 250° F. (121° C.), more typically at least about 500° F. (260° C.) to form corrosion resistant coating 64. Coating 64 may be formed to any thickness up to the maximum thickness ($T_c$) as previously defined by formulas (6) through (10).

Figure 3:
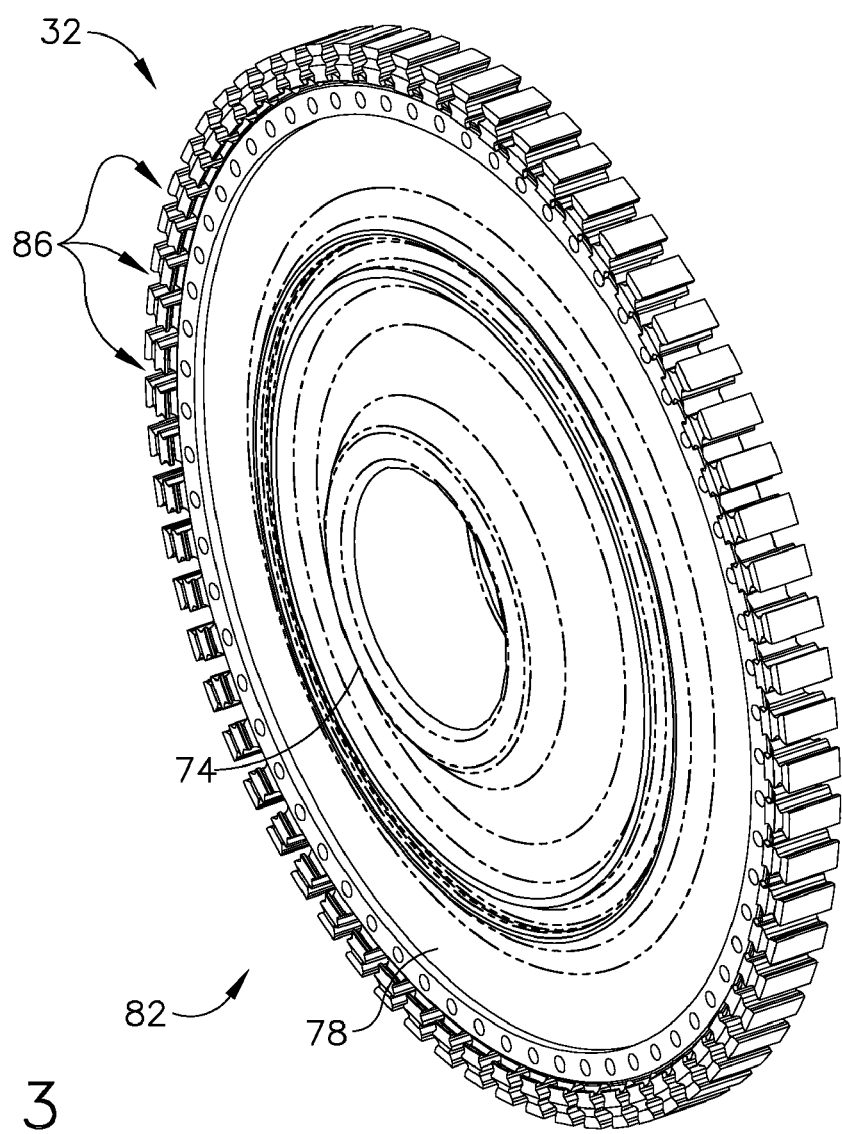
FIG. 3 is a frontal view of a turbine disk showing where the corrosion resistant coating of this invention can be desirably located.

As illustrated in FIG. 3, typically only a portion of the surface of these turbine disks/shafts, seals and/or blade retainers are provided with the corrosion resistant coating 64 of this invention. FIG. 3 shows a turbine disk 32 having an inner generally circular hub portion indicated as 74 and an outer generally circular perimeter or diameter indicated as 78, and a periphery indicated as 82 that is provided with a plurality of circumferentially spaced slots indicated as 86 for receiving the root portion of turbine blades such as 38, 42. While the corrosion resistant coating 64 may be applied to the entire surface of disk 70, it is typically needed only on the surface of outer diameter 78, as well as blade slots 86.

Coating 64 may be formed as a single layer, or may be formed as a plurality of layers. In forming a plurality of layers in coating 64, each respective layer may be formed by depositing a coating composition and then curing the deposited composition, with the layers being built up by depositing new portions of a coating composition on the underlying layer that was previously formed. A least one of the layers comprising coating 64 is formed from embodiments of the corrosion resistant coating composition of this invention and is adjacent to metal substrate 60, with other layers being formed from embodiments of the corrosion resistant coating composition of this invention or from other coating compositions. The respective layers of coating 64 may have the same or differing thicknesses. For example, when coating 64 comprises a plurality of layers, these layers typically tend to decrease in thickness in the direction from the inner layers (i.e., those closer to substrate 60) to the outer layers (i.e., those layers further away from substrate 60). The coating composition used in forming each of the respective layers may have the same or differing levels of particulate component and glass-forming binder component, as well as the same or differing types of particulates in the particulate component.

The coating composition used in forming each of the respective layers may also have the same or a differing binder component, for example, magnesium phosphate in the inner layers and aluminum phosphate in the outer layers. In addition, the level of particulates in the particulate component of the coating composition may differ in the respective layers, and typically increases from the inner layers to the outer layers. For example, the inner layer or layers adjacent to the metal substrate may be formed from embodiments of the corrosion resistant coating compositions of this invention that comprise a higher level or amount of corrosion resistant particulates (e.g., yttria-stabilized zirconia or hafnia particulates) having a higher CTEs with a better CTE match with the metal substrate, while the outer layer or layers not adjacent to the metal substrate may comprise a higher level or amount of corrosion resistant particulates (e.g., alumina particulates) having lower CTEs.

Each layer of coating 64 deposited may be cured to the same or different degrees. If desired, an outer glassy sealant layer may be formed for coating 64 by depositing and curing a composition that is similar to or consists essentially of a glass-forming binder component that is substantially free of the particulate component, e.g., a sealant composition. Such outer glassy sealant layers may be formed from commercially available sealant products, for example, Alseal 598 (from Coatings for Industry, Inc.), SermaSeal TCS or SermaSeal 570A (from Sermatech International), etc.

Figure 4:
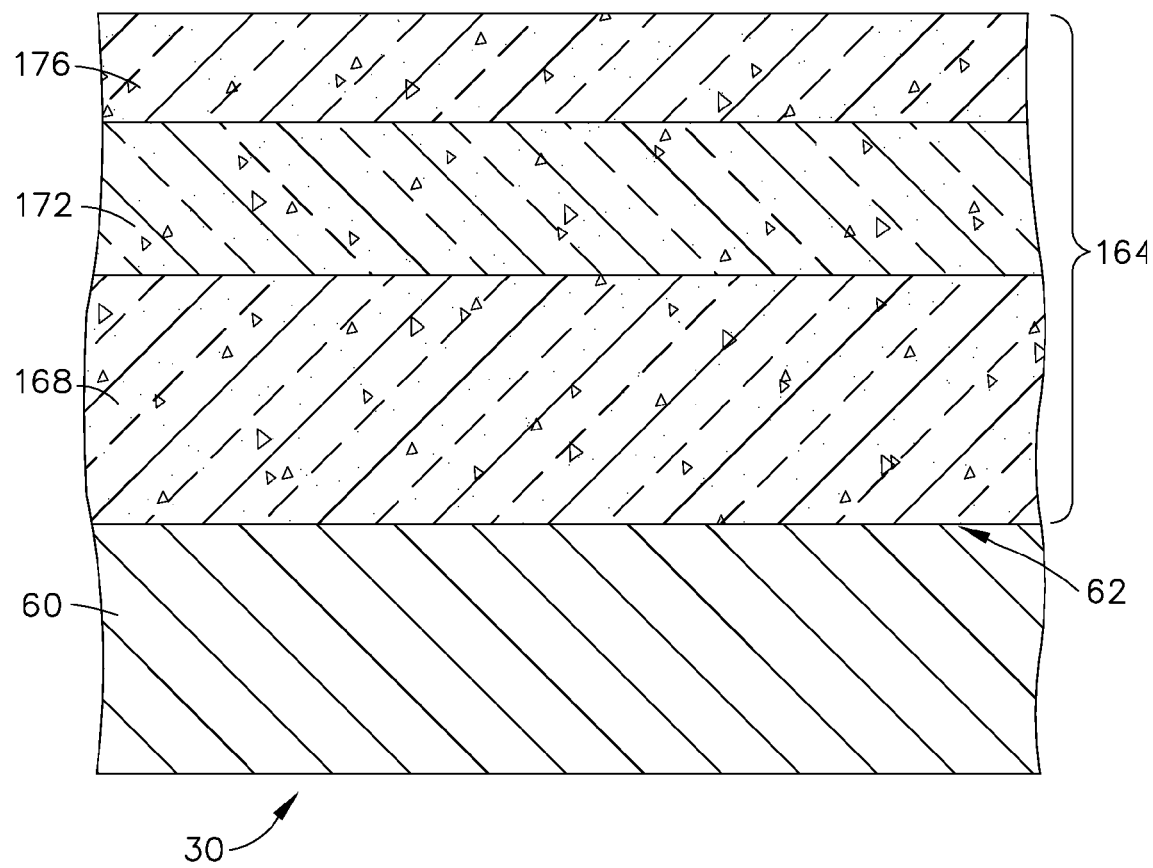
FIG. 4 is a schematic view similar to FIG. 2 of a corrosion resistant coating of this invention comprising a plurality of layers.

An embodiment of a corrosion resistant coating of this invention comprising a plurality of layers is shown in FIG. 4 and is indicated generally as 164. As shown in FIG. 4 coating 164 comprises an inner layer 168 that is adjacent to and overlaying metal substrate 60, and is formed from a corrosion resistant coating composition of this invention. Inner layer 168 is relatively thick and typically comprises from about 10 to about 90%, more typically from about 25 to about 75%, of the total coating thickness. The particulate component comprising inner layer 168 also typically has a greater level or amount of particulates having higher CTE values to provide a better CTE match with substrate 60.

Coating 164 also comprises an intermediate layer indicated generally as 172 adjacent to and overlaying inner layer 168. Intermediate layer 172 may be relatively thinner, especially relative to inner layer 168. Intermediate layer 172 typically comprises from about 10 to about 90%, more typically from about 25 to about 75%, of the total coating thickness. The particulate component of intermediate layer 172 can also comprise an increased amount or level of particulates having lower CTE values than that present in inner layer 168 because there is less of a need for a CTE match with inner layer 168.

As shown in FIG. 4, coating 164 may further comprise an outer layer indicated generally as 176 adjacent to and overlaying intermediate layer 172. (In the absence of layer 176, layer 172 would become the outer layer of coating 164, i.e., overlaying and directly adjacent to inner layer 168.) This outer layer 176 can comprise a particulate component, but is typically substantially free of particulates. Typically, outer layer 176 is formed from a sealant composition or a composition that consists essentially of, or entirely of, a glass-forming binder component (i.e., is substantially free of particulates) to form a glassy outer sealant layer. Outer layer 176 is also typically the thinnest layer of coating 164, especially when substantially free of particulates. Typically, outer layer 176 has a thickness of from about 0.01 to about 1 mils (from about 0.3 to about 25.4 microns), more typically from about 0.05 to about 0.5 mils (from about 1.3 to about 12.7 microns).

While the above embodiments have been described in the context of coating turbine engine disks, this invention can be used to form corrosion resistant coatings, as described above, on the surfaces of various other turbine engine rotor components, including turbine shafts and seals, exposed to oxygen and other corrosive elements at elevated temperatures, turbine components comprising airfoils, for example turbine blades and vanes, etc. The corrosion resistant coatings of this invention can also be applied during original manufacture of the component (i.e., an OEM component), after the component has been in operation for a period of time, after other coatings have been removed from the component (e.g., a repair situation), while the component is assembled or after the component is disassembled, etc.

While specific embodiments of this invention have been described, it will be apparent to those skilled in the art that various modifications thereto can be made without departing from the spirit and scope of this invention as defined in the appended claims.

What is claimed is:

1. A composition comprising:
   a glass-forming binder component; and
   a particulate corrosion resistant component adhered to the glass-forming binder component and comprising corrosion resistant particulates having:
   a $CTE_p$ of at least about 4 and being solid at a temperature of about 1300° F. or greater; and
   a maximum median particle size defined by one of the following formulas:
   (1) for a $CTE_p$ of 8 or less, an $M_p$ equal to or less than $(4.375 \times CTE_p) - 10$; and
   (2) for a $CTE_p$ of greater than 8, an $M_p$ equal to or less than $(-4.375 \times CTE_p) + 60$,
   wherein $CTE_p$ is the average CTE of the corrosion resistant particulates and wherein $M_p$ is the median equivalent spherical diameter (ESD), in microns, of the corrosion resistant particulates;
   wherein the corrosion resistant coating has a maximum thickness defined by one of the following formulas:
   for a $CTE_p$ of 8 or less, an $T_c$ equal to or less than $(1.5 \times CTE_p) - 3.5$; and
   for a $CTE_p$ of greater than 8, an $T_c$ equal to or less than $(-1.5 \times CTE_p) + 20.5$;
   wherein $T_c$ is the thickness, in mils, of the corrosion resistant coating.

2. The composition of claim 1, wherein the corrosion resistant particulates have a $CTE_p$ in the range of from about 4 to about 12.

3. The composition of claim 2, wherein the maximum median particle size is defined by one of the following formulas: (3) for a $CTE_p$ of 8 or less, an $M_p$ equal to or less than $(2.1875 \times CTE_p) - 5$; and (4) for a $CTE_p$ of greater than 8, an $M_p$ equal to or less than $(-2.1875 \times CTE_p) + 30$.

4. The composition of claim 2, wherein the corrosion resistant particulates have a maximum particle size defined by one of the following formulas: (5) for a $CTE_p$ of 8 or less, an $A_p$ equal to or less than $(10.938 \times CTE_p)-25$; and (6) for a $CTE_p$ of greater than 8, an $A_p$ equal to or less than $(-10.938 \times CTE_p)+150$, wherein $A_p$ is the maximum particle size, in microns.

5. The composition of claim 1, wherein the corrosion resistant particulates comprise a ceramic.

6. The composition of claim 5, wherein the ceramic is a metal oxide, carbide, nitride, or combination thereof.

7. The composition of claim 6, wherein the corrosion resistant particulates comprise alumina, chromia, magnesia, hafnia, or a yttria-stabilized zirconia or hafnia.

8. The composition of claim 1, wherein the corrosion resistant particulates comprise a metal.

9. The composition of claim 8, wherein the metal is an overlay metal alloy having the formula MCr, MAl, MCrAl, MCrAlX, or MAlX, wherein M is iron, cobalt, nickel, or an alloy thereof and wherein X is hafnium, zirconium, yttrium, tantalum, platinum, palladium, rhenium, silicon, lanthanum, or a combination thereof.

10. The composition of claim 9, wherein the overlay metal alloy comprises a MCrAlY alloy, wherein M is nickel, cobalt or a nickel-cobalt alloy.

11. The composition of claim 1, wherein the corrosion resistant particulates comprise a combination of a ceramic and a metal.

12. The composition of claim 1, wherein the glass-forming binder comprises a phosphate-containing binder component.

13. The composition of claim 12, wherein the phosphate-containing binder component comprises one or more of an aluminum phosphate, a magnesium phosphate, or a chromium phosphate.

14. The composition of claim 12, wherein the phosphate-containing binder component is substantially free of other binder materials.

15. The composition of claim 1, which further comprises a liquid carrier component.

16. The composition of claim 15, wherein the liquid carrier component comprises water.

17. A composition comprising:
a glass-forming binder component; and
a particulate corrosion resistant component adhered to the glass-forming binder component and comprising corrosion resistant particulates having:
  a $CTE_p$ of at least about 4 and being solid at a temperature of about 1300° F. or greater; and
  a maximum median particle size defined by one of the following formulas:
    (1) for a $CTE_p$ of 8 or less, an $M_p$ equal to or less than $(4.375 \times CTE_p)-10$; and
    (2) for a $CTE_p$ of greater than 8, an $M_p$ equal to or less than $(-4.375 \times CTE_p)+60$,
wherein $CTE_p$ is the average CTE of the corrosion resistant particulates and wherein $M_p$ is the median equivalent spherical diameter (ESD), in microns, of the corrosion resistant particulates;
wherein the corrosion resistant coating has a maximum thickness defined by one of the following formulas:
  for a $CTE_p$ of 8 or less, an $T_c$ equal to or less than $(1.5 \times CTE_p)-3.5$; and
  for a $CTE_p$ of greater than 8, an $T_c$ equal to or less than $(-1.5 \times CTE_p)+20.5$;
wherein $T_c$ is the thickness, in mils, of the corrosion resistant coating and wherein the particulate corrosion resistant component comprises bimodal particle size distribution having from about 60 to about 95% by volume of a larger particle size fraction and from about 5 to about 40% by volume of a smaller particulate size fraction, wherein the larger particle size fraction comprises particulates having a median ESD at least about 5 times that of the median ESD of the particulates comprising the smaller particulate size fraction.

18. The composition of claim 17, wherein the larger particle size fraction comprises particulates having a median ESD in the range of from about 7 to about 10 times that of the median ESD of the particulates comprising the smaller particulate size fraction.

* * * * *